INVENTOR.
ARTHUR E. VOGEL

INVENTOR.
ARTHUR E. VOGEL

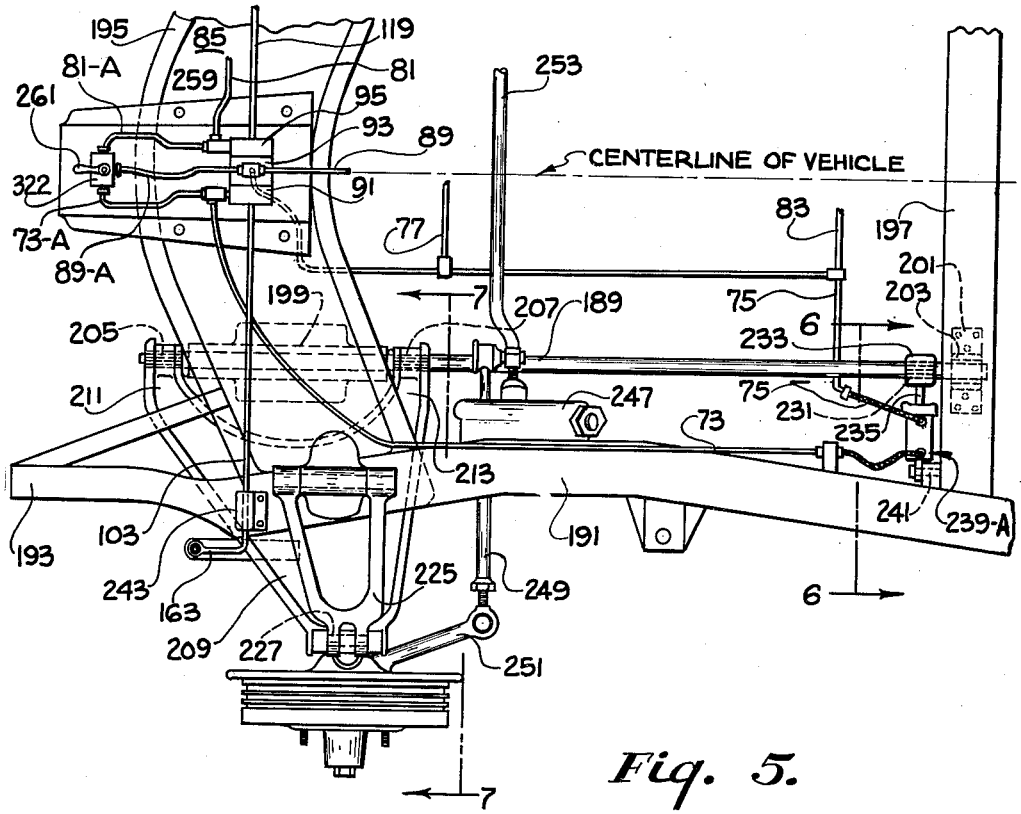

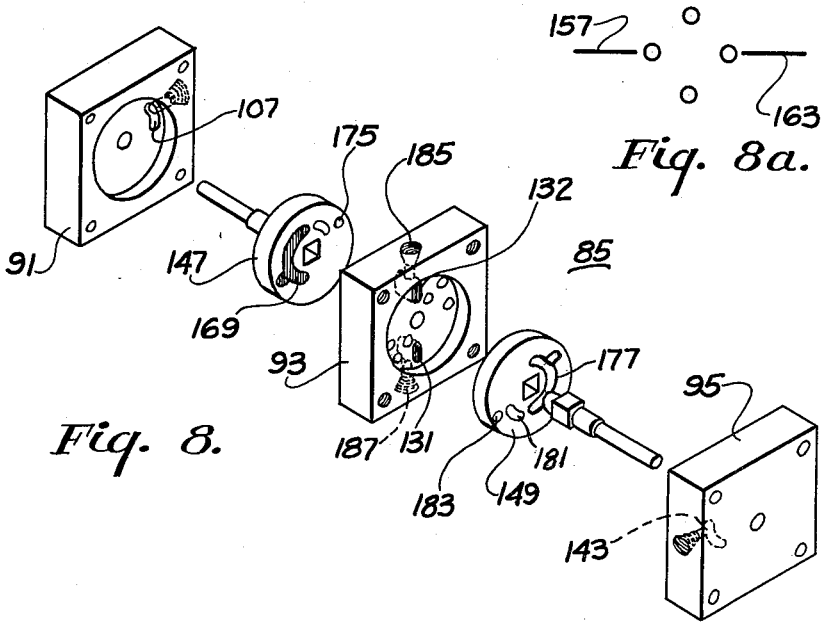
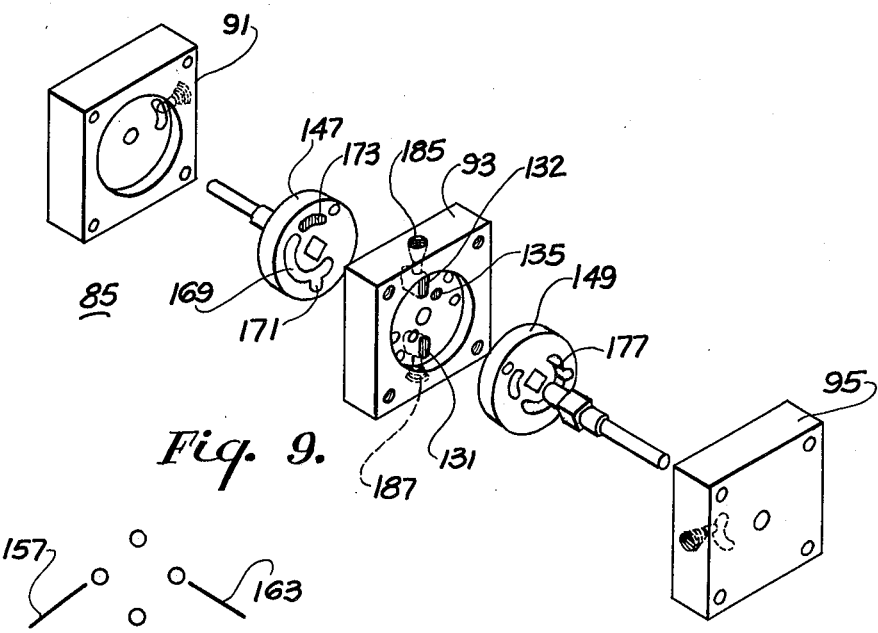

Sept. 17, 1963 A. E. VOGEL 3,104,114
CONTROL SYSTEM FOR VEHICLE SUSPENSION
Filed March 25, 1959 11 Sheets-Sheet 6
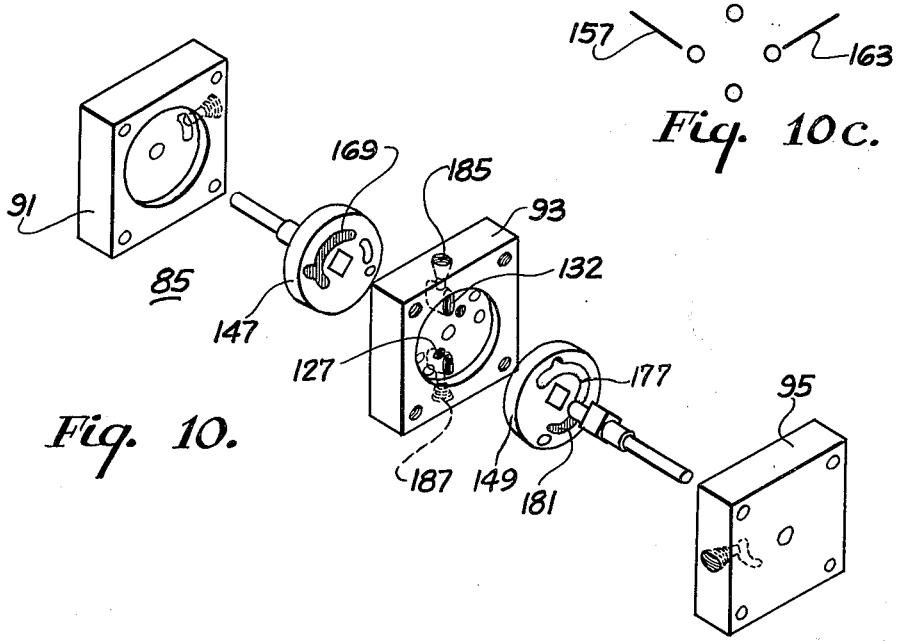
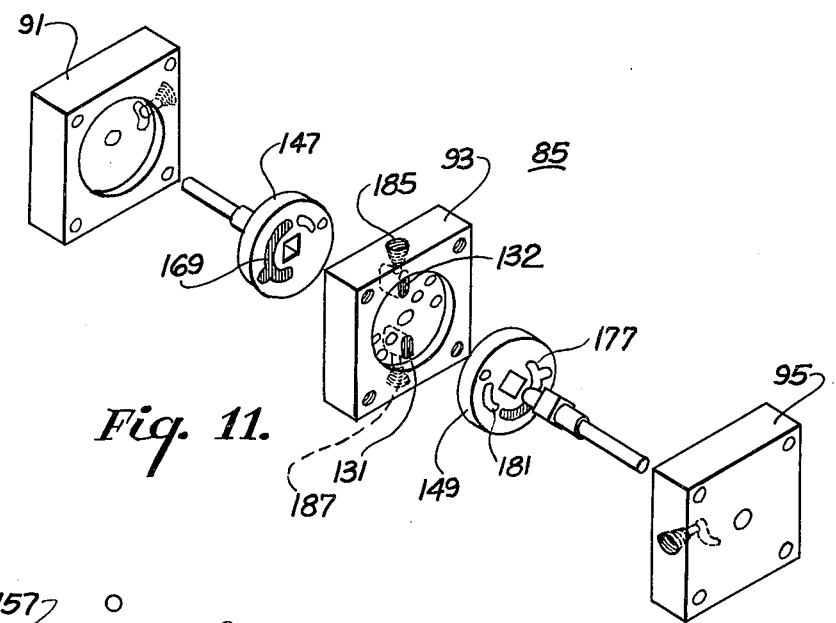
INVENTOR.
ARTHUR E. VOGEL
BY Schmieding and Fultz
ATTORNEYS

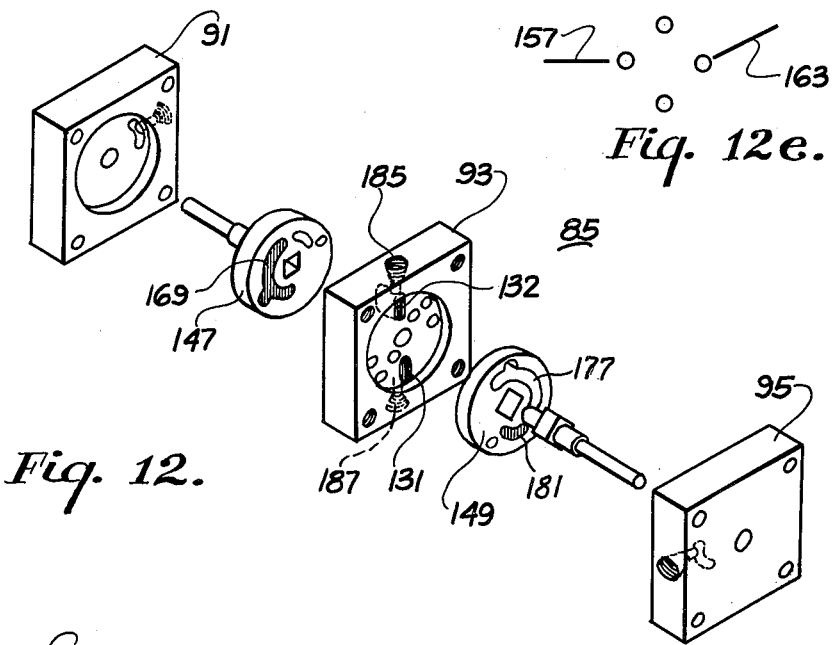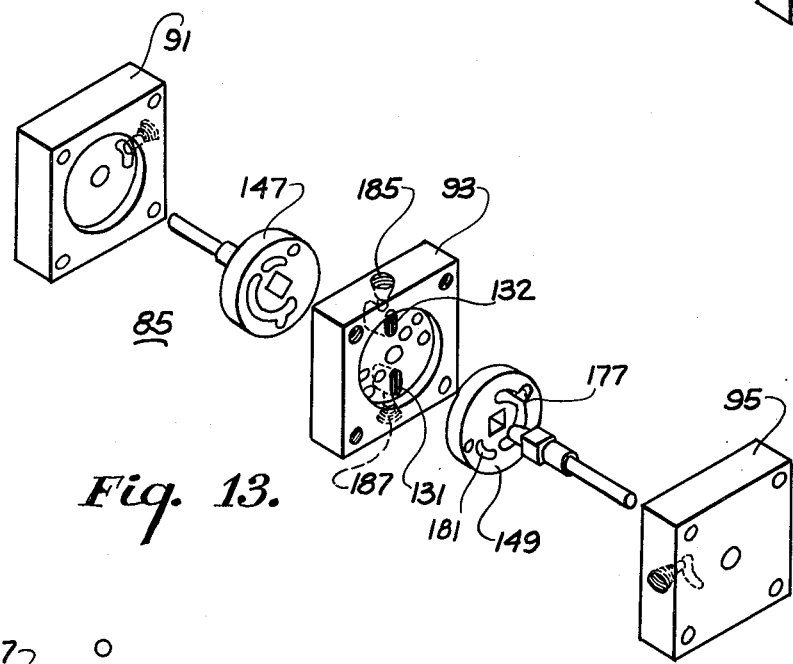

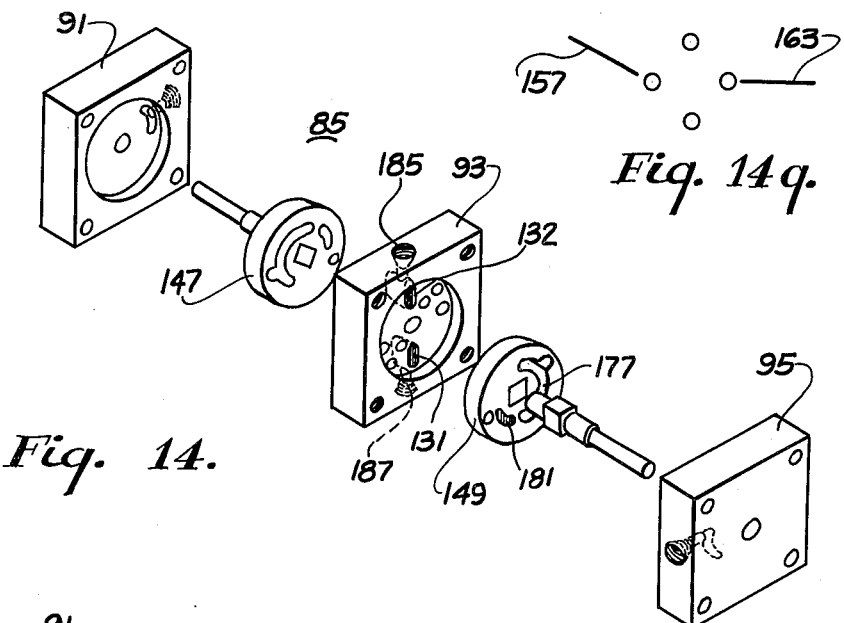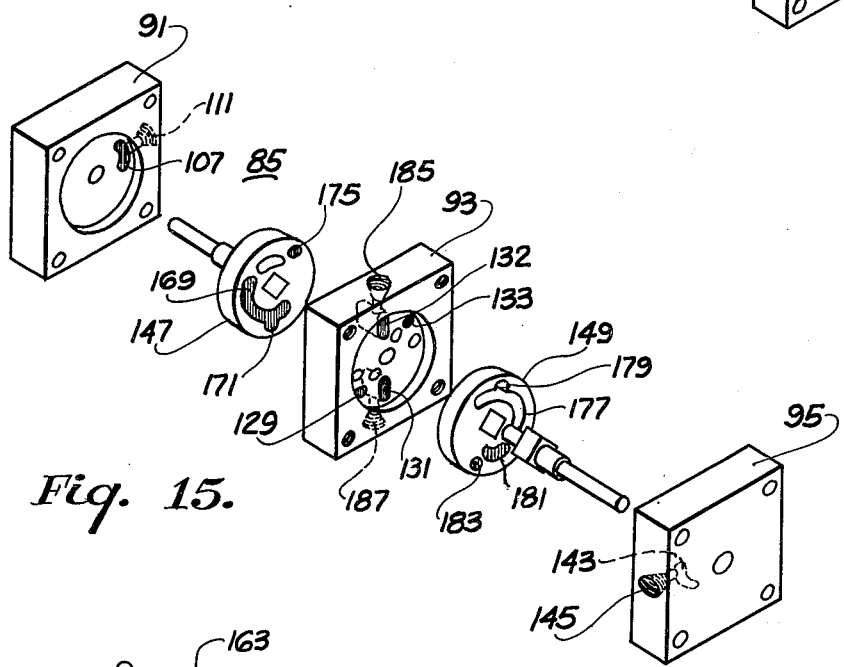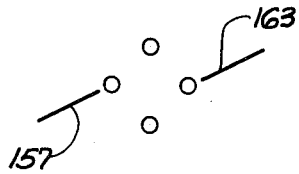

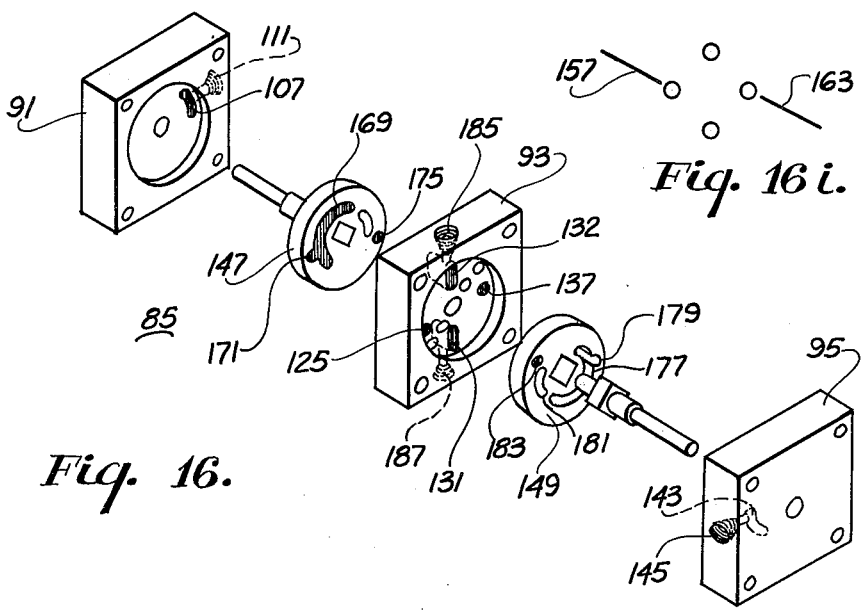
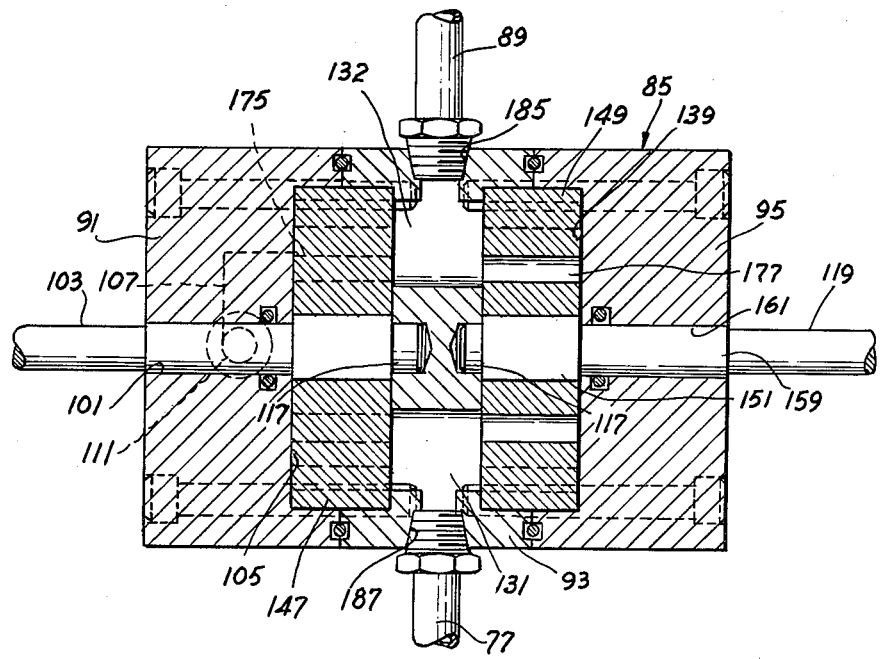

United States Patent Office 3,104,114
Patented Sept. 17, 1963

3,104,114
CONTROL SYSTEM FOR VEHICLE SUSPENSION
Arthur E. Vogel, Columbus, Ohio, assignor, by direct and mesne assignments, of one-half to Dawson-Vogel Engineering Company, one-fourth to Palmer Fuitz, and one-fourth to Warren H. F. Schmieding, all of Columbus, Ohio
Filed Mar. 25, 1959, Ser. No. 801,863
13 Claims. (Cl. 280—6.1)

The present invention relates to apparatus for controlling the sprung weight portion supporting system of a vehicle, which vehicle includes the sprung weight portion, an unsprung portion, and resilient means under pressure on the right and left sides of the vehicle and between the unsprung and sprung weight portions of the vehicle.

The resilient means may be of any of the conventional designs such as springs, resilient or flexible cells or combinations thereof. Mechanism is provided for increasing the pressure of the right resilient means when the sprung weight moves in a clockwise direction, as for example by centrifugal force as the vehicle negotiates a left turn, or, as shown, the mechanism effects the increasing of the pressure of the right resilient means and, simultaneously, decreases the pressure on the left resilient means when the sprung weight moves clockwise, and the reverse occurs in pressure of the right and left resilient means when the sprung weight moves counterclockwise.

This mechanism includes a source of fluid under pressure, for controlling the pressures of the resilient means, and a valve for controlling the flow of fluid, the valve being so designed and controlled that the fluid pressure is effective only when the sprung weight moves in a clockwise or counterclockwise direction. In other words, the pressures on the resilient means are not varied through the control mechanism if, for example, the right or left wheels of the vehicle move into a depression in the road, or move over a bump in the road, or if both wheels are lowered simultaneously or raised simultaneously.

In one embodiment of the invention, the resilient means are shown as flexible right and left air cells. In this embodiment, air pressure is increased in the right cell and simultaneously descreased in the left cell when the sprung weight moves clockwise, and when the sprung weight moves counterclockwise, the pressure in the left cell is increased and, simultaneously, the pressure in the right cell is decreased. Such change in pressure occurs only upon either clockwise or counterclockwise movement of the unsprung weight.

In another embodiment of the invention, the resilient means are in the form of torsion bars, one being disposed on the right side of the vehicle and the other on the left side of the vehicle. Each bar has an end connected with the unsprung weight and an end connected with the sprung weight. These bars are formed of resilient metal such as hardened steel, and, when supporting the sprung weight, are twisted about their longitudinal axis. The twisting pressures are varied on the bars for increasing and decreasing the pressure thereon, i.e., as the sprung weight moves clockwise, the torsion of the right bar is increased and, simultaneously, the torsion of the left bar is decreased, and vice versa, when the sprung weight moves counterclockwise.

Further objects and advantages will be apparent from the following description, reference being had to the accompanying drawings wherein preferred embodiments of the invention are illustrated.

In the drawings:

FIG. 5 is a fragmentary top plan view of the forward and left side of an automobile;

FIG. 6 is a fragmentary sectional view of a motor comprising a portion of a torsion bar stabilizing apparatus constructed according to the present invention, the view being taken on line 6—6 of FIG. 5;

FIG. 7 is a fragmentary view taken on line 7—7 of FIG. 5;

FIG. 8a is a diagrammatic view similar to "Pos. a" of FIG. 4 showing the valve control arms in their neutral position;

FIG. 8 is a view similar to FIG. 3 showing the position of the valve parts when the valve control arms are in the position as shown in FIG. 8a;

FIG. 9b is a diagrammatic view similar to Pos. b of FIG. 4, showing both the valve control arms extended downwardly;

FIG. 9 is a view similar to FIG. 3 showing the position of the valve parts when the valve control arms are in the position shown in FIG. 9b;

FIG. 10c is a diagrammatic view similar to Pos. c of FIG. 4 and showing the valve arms in raised position;

FIG. 10 is a view similar to FIG. 3 showing the position of the valve parts when the valve arms are in the position shown in FIG. 10c;

FIG. 11d is a diagrammatic view similar to Pos. d of FIG. 4 showing the right arm lowered and the left arm in a horizontal position;

FIG. 11 is a view similar to FIG. 3 showing the position of the valve parts when the valve arms are in the position shown in FIG. 11d;

FIG. 12e is a diagrammatic view similar to Pos. e of FIG. 4 showing the right arm raised and the left arm in a horizontal position;

FIG. 12 is a view similar to FIG. 3 showing the position of the valve parts when the valve arms are in the position shown in FIG. 12e;

FIG. 13f is a view similar to Pos. f of FIG. 4 showing the right arm in a horizontal position and the left arm in a lowered position;

FIG. 13 is a view similar to FIG. 3 showing the position of the valve parts when the arms are in the position shown in FIG. 13f;

FIG. 14g is a diagrammatic view similar to Pos. g of FIG. 4 showing the right arm in a horizontal position and the left arm in a raised position;

FIG. 14 is a view similar to FIG. 8 showing the position of the valve parts when the arms are in the position shown in FIG. 14g;

FIG. 15h is a view similar to Pos. h of FIG. 4 showing the right arm raised and the left arm lowered;

FIG. 15 is a view similar to FIG. 3 showing the position of the valve parts when the arms are in the position shown in FIG. 15h;

FIG. 16i is a diagrammatic view similar to Pos. i of FIG. 4 showing the right arm lowered and the left arm raised;

FIG. 16 is a view similar to FIG. 8 showing the position of the valve parts when the arms are in the position shown in FIG. 16i;

FIG. 17 is a sectional view taken on line 17—17 of FIG. 3;

Figure 1:
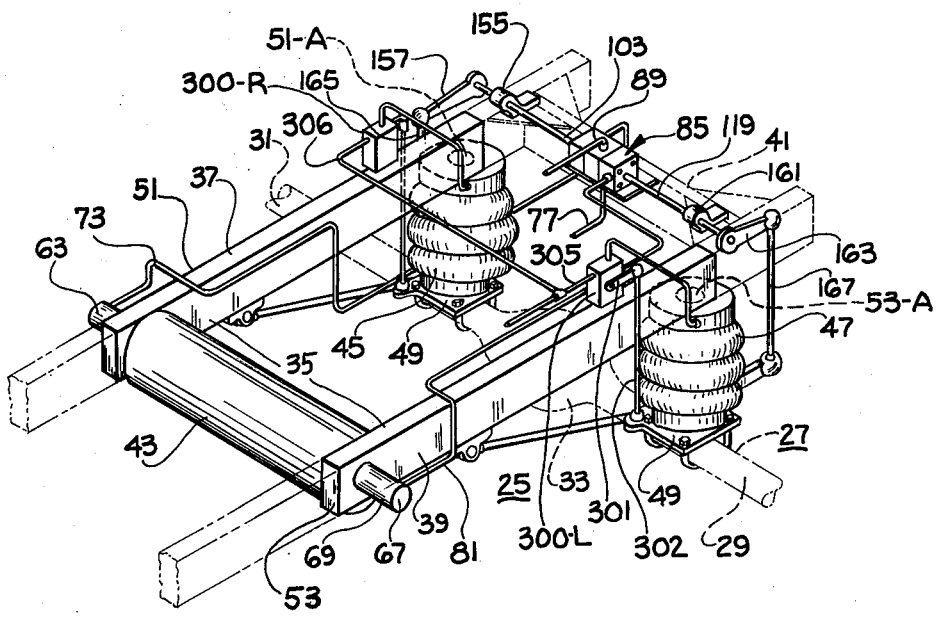
FIG. 1 is a fragmentary perspective view of the rear end of a chassis of a vehicle such as an automobile or automotive truck, parts of the chassis being shown in dot and dash line to prevent obscuring of the mechanism which forms part of the invention.

Referring more in detail to the drawings, FIG. 1 fragmentarily shows the rear end of an automotive truck 25. Part of the unsprung weight is shown in phantom at 27 comprising the rear axles 29 and 31 and the differential 33. Part of the sprung weight is shown by the framework 35, including the right beam 37, left beam 39, rear cross member 41 and a forwardly disposed cross member 43 in the form of a cylinder.

Resilient means is disposed between the unsprung and the sprung weight portions of the chassis and is herein shown as right cell 45 and left cell 47. These cells contain air alone. These cells 45 and 47 are carried by seats 49 suitably bolted to the axles 31 and 29.

Cells 45 and 47 normally receive air from and release air to a conventional air control apparatus that includes a left leveling valve 300–L and a right control leveling valve 300–R.

Each of the air control valves 300–L and 300–R includes a movable flow control element, within the valve, which is moved upwardly or downwardly by an arm 301 and rod 302 which rods connect the movable flow control element with the unsprung weight as seen in FIG. 1. Lines 305 and 306 connect conventional air control valves 300–L and 300–R with a source of pressurized air, not illustrated. It will be understood that conventional air control valves 300–L and 300–R operate in a conventional manner to levelize the vehicle in response to variations in static load conditions. Hence, the levelizing corrections are applied slowly and are in no way effective in stabilizing the vehicle when subjected to sudden variations in dynamic forces such as centrifugal force encountered in cornering.

Figure 2:
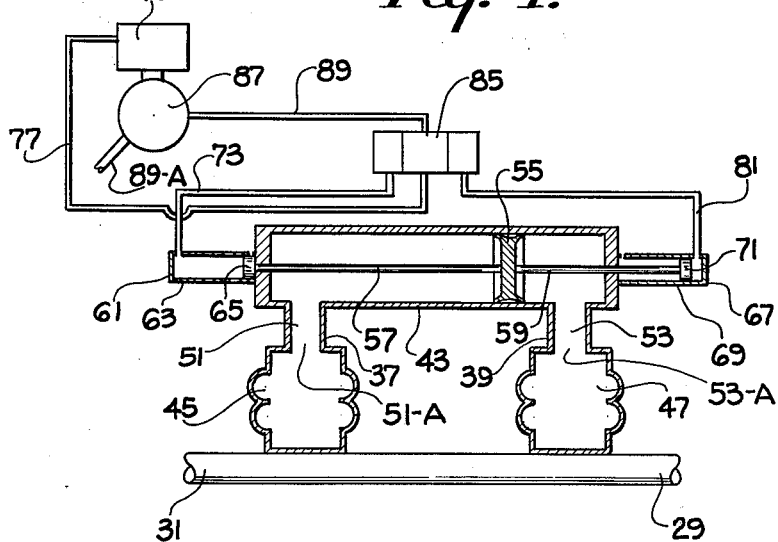
FIG. 2 is a diagrammatic view of the fluid system shown in FIG. 1.

Referring now particularly to the diagrammatic view of FIG. 2, inasmuch as we are looking rearwardly, that is toward the back end of the automotive vehicle, the left side of the car is in fact the right side, and the right side is in fact the left, but inasmuch as the right and left sides are normally referred to while facing forwardly, such nomenclature will be carried out. Therefore it will be observed that the right side of the cylinder 43 is connected by a duct 51 to a hole 51–A in the top of right cell 45 and the left end of the cylinder 43 is connected by a duct 53 to a hole 53–A in the top of left cell 47. The cylinder 43 carries a plunger or piston 55, which, when moved to the right, causes increase in pressure in cell 45 and a decrease in pressure in cell 47, and, when it moves to the left, it causes an increase in pressure in cell 47 and a decrease in pressure in cell 45. This plunger is moved within the cylinder 43 by rods 57 and 59. Rod 57 is a part of a motor 61, the motor including a cylinder 63 and a piston 65 secured to the rod 57. The rod 59 is a part of a motor 67 including a cylinder 69 and a piston 71.

In general, valve 85 serves to either pressurize left cylinder 69 and simultaneously drain right cylinder 63 or pressurize right cylinder 63 and pressurize left cylinder 69 or isolate both left cylinder 69 and right cylinder 63 from both the source of pressurized fluid in the form of a pump 87 and a reservoir 79. Valve 85 receives pressurized hydraulic fluid from the pump via duct line 89 and releases hydraulic fluid back to reservoir 79 via line 77. Lines 73 and 81 connect motors 61 and 67 to valve means 85.

As will appear more in detail hereinafter, the piston 55 is normally in a position midway between the ends of the cylinder 43 and it will be moved to increase the pressure in cell 45 and decrease the pressure in cell 47 only when the sprung weight moves clockwise, and will be moved to increase the pressure in cell 47 and decrease the pressure in cell 45 only when the sprung weight moves counterclockwise. To increase the pressure in cell 45 and decrease the pressure in cell 47, the pump 87 must be connected to the cylinder 69 through duct 89, valve 85 and duct 81. To move the piston 55 to increase the pressure in cell 47 and decrease the pressure in cell 45, the cylinder 63 must be connected to the pump 87 through the duct 89, valve 85 and duct 73.

Figure 3:
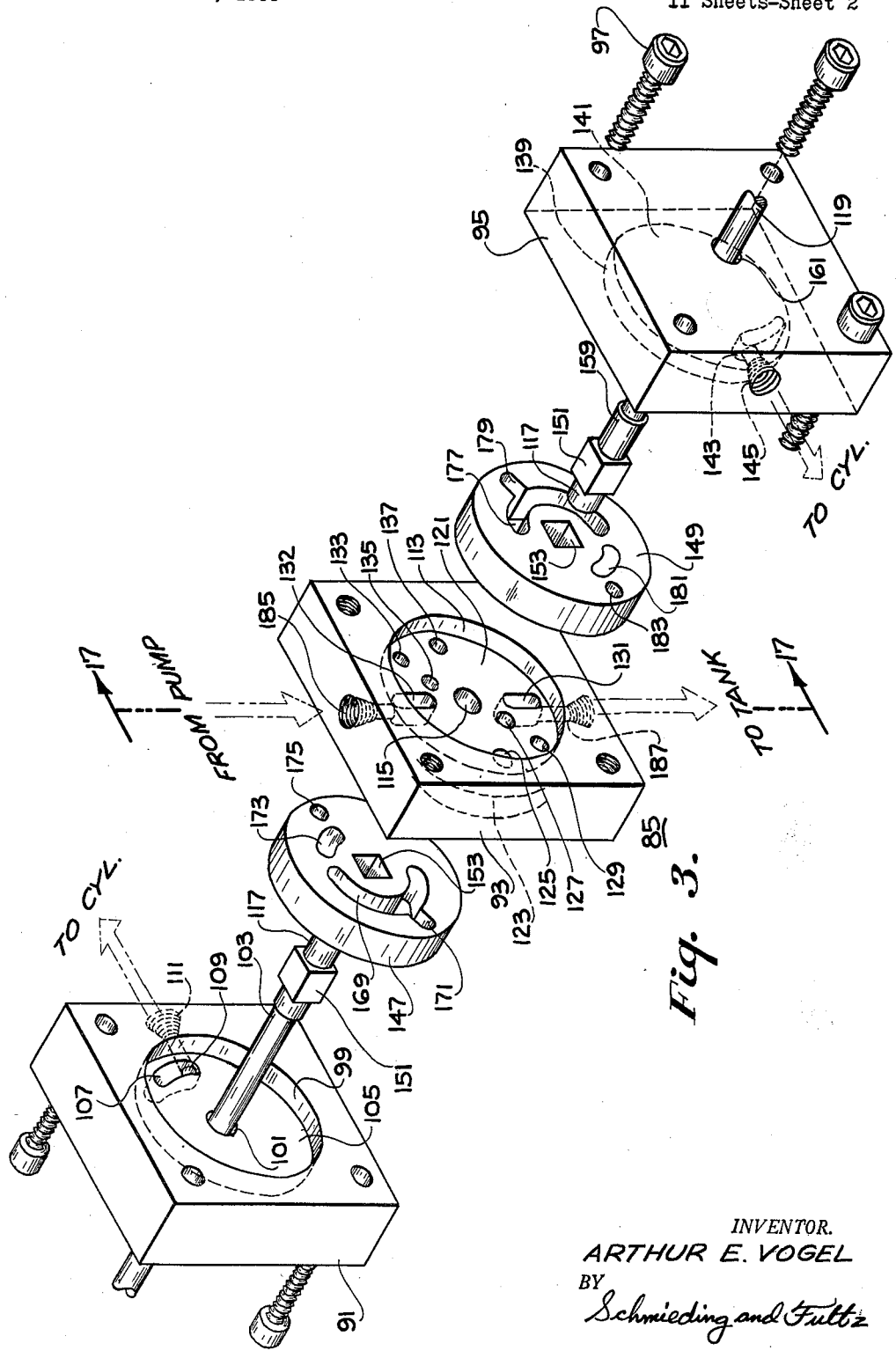
FIG. 3 is an exploded view of one of the valves utilized for controlling the system, the parts being shown in their neutral position.
Figure 4:
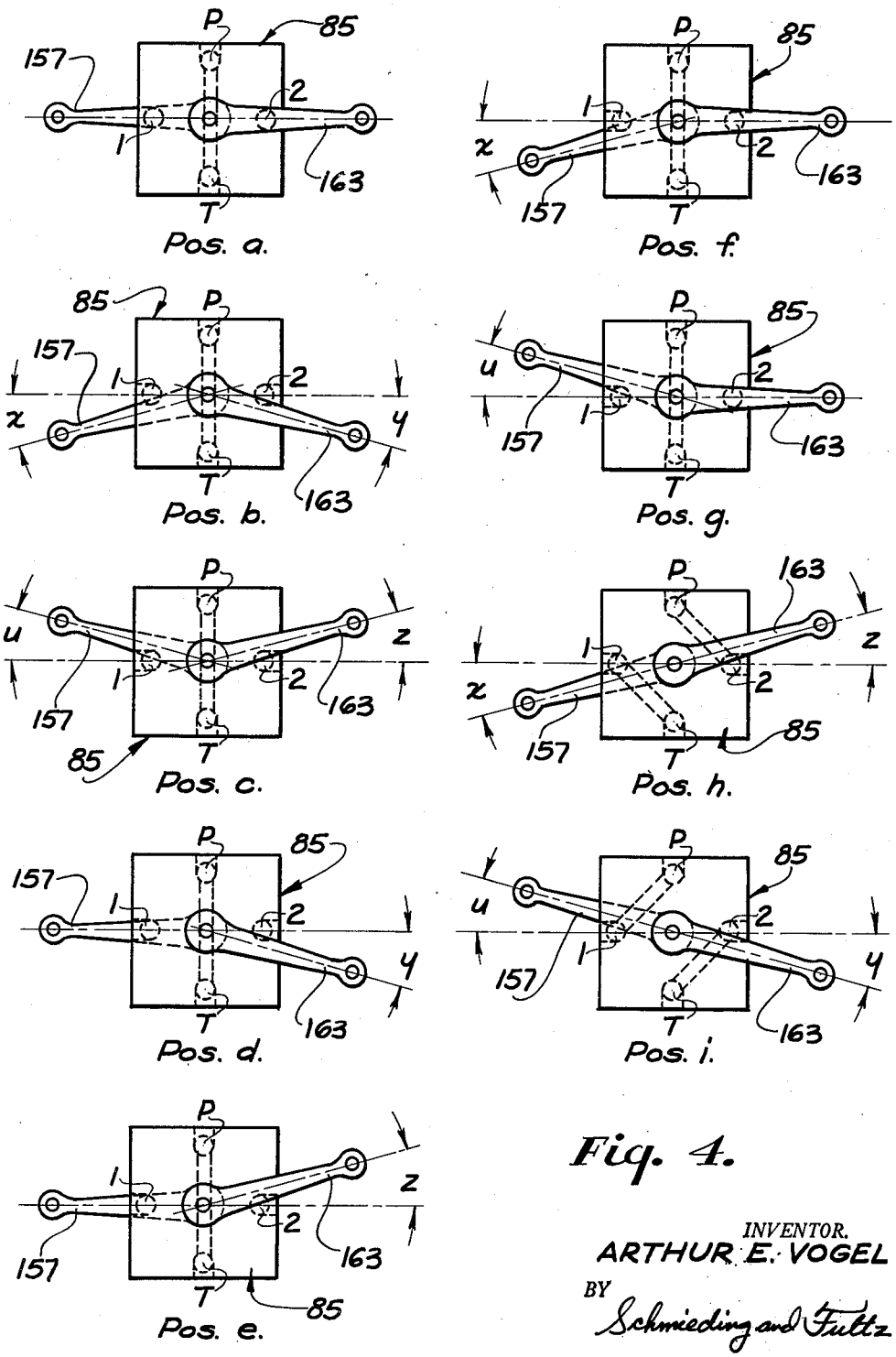
FIG. 4 shows, diagrammatically, the valve of FIG. 3 in nine different positions.

The valve 85 is more clearly shown in FIGS. 3 and 17. It comprises three stationary blocks 91, 93, and 95 which are fastened to one another side by side by bolts 97, there being a gasket between blocks 91 and 93, and between 93 and 95. For the sake of clarity these gaskets have been omitted. Block 91 is provided with a large, circular recess 99 and a concentric smaller hole 101, the material thereabout forming a bearing for a shaft 103. The rear wall of the recess is indicated at 105. This wall 105 is provided with an arcuate shaped recess 107 which registers with a port opening 109 of a hole 111 extending to the exterior of the block. The duct 73 is connected with this hole 111.

A similar recess 113 is formed in block 93. The block is also drilled at 115 in axial alignment with the circular recess 113 for receiving the circular end 117 of a shaft 119. The rear wall of the circular recess is shown at 121. The opposite face of block 93 is provided with a circular recess 123. The intermediate wall 121 is drilled to form ports 125, 127, 129, 131, 132, 133, 135 and 137.

Block 95 is of the same configuration as block 91 in that it is provided with a circular recess 139 having a rear wall 141, an arcuately shaped port 143 and a drilled hole 145 which like hole 111 is threaded and is coupled with duct 81.

Recess 105 in block 91 confronts and is aligned with recess 123 of block 93, and recess 113 of block 93 confronts and is aligned with recess 139 of block 95. The passages of fluid through the ports heretofore mentioned are controlled by two cylindrically shaped movable valves 147 and 149. Valve 147 snugly fits within the recess 105 of block 91 and recess 123 of block 93, and valve 149 snugly fits within the recess 113 of block 93 and recess 139 of block 95. These valves are actuated, respectively, by the shafts 103 and 119, to which they are, respectively, suitably attached as by the square portions 151 which fit within the sockets 153 in the valves 147 and 149.

The shaft 103 is not only journaled at its end 117 in bearing 115 and in bearing 101 of block 91 but, as seen in FIG. 1, it is also journaled in a bearing 155 which is attached to the cross member 41. The extreme end of this shaft 103 has a valve operating arm 157 connected thereto. Shaft 119 has its end 117 journaled in hole 115, a portion 159 thereof journaled in the hole 161 of block 95, and, as seen in FIG. 1, in a bearing 161. The outer extreme end of this shaft 119 has an arm 163 attached thereto.

It will be observed that this valve including the actuating arms 157 and 163 thereof are carried by the sprung weight of the chassis. Arm 157 is connected by a connecting rod 165 to the right side of the unsprung weight, and arm 163 is connected by a similar rod 167 to the unsprung weight on the left side of the chassis. From the foregoing it will be seen that should the right rear wheel of the chassis move into a depression, the connecting rod 165 will pull the arm 157 downwardly, or should the right rear wheel strike a bump in the road, the arm 157 would be moved upwardly. Likewise should the left rear wheel move into a depression in the road, the arm 163 would be moved downwardly, or should the left rear wheel strike a bump in the road, the arm 163 would be moved upwardly. It is also obvious that the valve 147 would be moved counterclockwise upon the right rear wheel moving into a depression, and would be moved clockwise should the right rear wheel strike a bump. Also the valve 149 would be moved clockwise should the left rear wheel strike a depression in the road, and would be moved counterclockwise should the left rear wheel strike a bump.

Valve 147 is provided with an arcuately and concentrically arranged port 169 having a radially extending and connected port section 171. It is also provided with an arcuately and concentrically arranged port 173 and a port 175 near the periphery thereof. These ports extend longitudinally and through the cylindrically shaped valve. Similarly shaped ports and port sections are formed in valve 149 and are indicated as port 177 having a radially extending section 179, port 181 and port 183.

The central block 93 is provided with an inlet opening 185 in the top thereof which is threaded to receive duct 89. This opening leads into port 132. Central block 93 is also provided with a hole 187 which leads from port 131 and has its outer end threaded for connection with duct 77 which in turn leads to drain or tank comprising the reservoir 79.

The valve is shown in its neutral or normal position in FIGS. 3 and 8, i.e., the arms 157 and 163 lie in a horizontal plane. In this position the path of the fluid, which may be a hydraulic fluid, is as follows: Pump 87, duct 89, inlet opening 185, port 132 of block 93, port 169 of valve 147 and port 177 of valve 149, to port 131 of block 93, hole 187 and drain pipe 77 to the reservoir. At this time the port 175 of valve 147 is not in alignment with any of the ports in block 93, and therefore no fluid will be conducted to port 107 of block 91, and, also at this time port 183 of valve 149 is not in alignment with any of the ports in the block 93 and therefore no fluid will be conducted to port 143 of block 95.

In order to trace this circuit more clearly, the active ports or passages only are numbered in FIG. 8 and such ports are also shown in the drawing as being shaded. Such procedure will be followed in the other circuits as depicted in FIGS. 9 to 16 inclusive.

Referring now to FIG. 9b and FIG. 9, in which both arms 157 and 163 are extended downwardly, the circuit through the valve is as follows: Passage 185, port 132, port 173 of valve 147, port 135 of block 93, port 177 of valve 149, port 131 of block 93 and thence by passage 187 to duct 77. At this time there is no complete alignment of ports supplying port 107 in block 91, nor is there a complete alignment of ports to supply port 143 of block 95.

Referring now to FIG. 10c and FIG. 10 in which both of the arms 157 and 163 are extended upwardly, the circuit through the valve 85 is as follows: Passage 185, port 132, port 169 of valve 147, port 127 of block 93, port 181 of valve 149, port 131 of block 93, and thence by passage 187 to drain. In this position of the valves 147 and 149, there is no complete alignment of ports leading to port 107 and block 91, nor is there a complete alignment of ports leading to port 143 of block 95.

Referring now to FIG. 11d and FIG. 11 in which the arm 163 is lowered and the arm 157 is in a horizontal position, the circuit through the valve 85 is as follows: Passage 185 to port 132 of block 93, port 169 of valve 147, port 131 of block 93 and thence by passage 187 to drain or tank. In these positions of the valves 147 and 149, there is no complete alignment of ports leading to port 107, nor is there a complete alignment of ports leading to port 143.

Referring now to FIG. 12e and FIG. 12 wherein the control arm 163 is in a raised position and control arm 157 is in a horizontal position, the circuit through the valve 85 is as follows: Passage 185, port 132 of block 93, port 169 of valve 147, port 131 of block 93 and thence by passage 187 to the tank or reservoir. In these positions of the valves, there is no complete alignment of ports leading to port 107, nor is there complete alignment of ports leading to port 103.

Referring now to FIG. 13f and FIG. 13 wherein the control arm 163 is in a horizontal position and arm 157 is lowered, the path through the valve 85 is as follows: Passage 185, port 132 of block 93, port 177 of valve 149, port 131 of block 91 and thence by passage 187 to the reservoir. Here again there is no complete alignment of ports leading to port 107 nor is there a complete aligning of ports leading to port 143.

Referring now to FIG. 14g and FIG. 14 wherein the arm 163 is in a horizontal position and arm 157 is raised, the path through the valve 85 is as follow: Passage 185, port 132, port 177 of valve 149, port 131 of block 93, and thence by passage 187 to the reservoir. Here again there is no complete registering of the ports with port 107, nor is there a complete registering of the ports with port 143.

Referring now to FIG. 15h and FIG. 15 wherein the control arm 163 is in a raised position and the control 157 is in a lowered position, the path through the valve 85 is as follows: Passage 185, port 132 in block 93, port 177 of valve 149, section 179 of port 177, port 133 of block 93, port 175 of valve 147, port 107 of block 91 leading to port 109 and thence by passage 111 to duct 73. Duct 73 leads to cylinder 63. The passage from cylinder 69 through the valve 85 to the reservoir is as follows: Cylinder 69, duct 81, passage 145 in block 95, port 143, port 183 of valve 149, port 129 of block 93, section 171 of port 169 of valve 147, port 169 to port 131 of block 93 and thence by passage 187 to the tank.

Thus it will be seen that in the position shown in FIG. 15h, the piston 55 will be moved to increase the pressure in cell 47 and decrease the pressure in cell 45.

Referring now to FIG. 16i and FIG. 16 wherein the control arm 163 is lowered and the control arm 157 is raised, the valves 147 and 149 are in such position that the path of fluid through the valve 85 is as follows: Passage 185, port 132 of block 93, port 169 of valve 147, section 171 to port 125 of block 93, port 183 of valve 189, port 143 of block 95, passage 145 to duct 81 leading to the cylinder 69 of motor 67. At this time the hydraulic fluid is drained from cylinder 63 and duct 73 through the valve 85, the passage through the valve being as follows: Passage 111 of block 91, ports 109 and 107, port 175 of valve 147, port 137 of block 93, section 179 of port 177 of valve 149, port 177, port 131 of block 93 and thence by passage 187 and duct 77 to the reservoir. At this time the piston 55 will be moved to increase the pressure within cell 45 and decrease the pressure within cell 47.

Thus it will be seen from the foregoing that the pressures within the cells 45 and 47 are varied only when the sprung weight moves clockwise or counterclockwise. That is, arm 157 must be moved downwardly and arm 163 must be moved upwardly simultaneously in order to vary the pressures within the cells 45 or 47, or, arm 157 must be moved upwardly and arm 163 moved downwardly before there is any change in pressure in cells 45 and 47. The purpose of this is to provide for preventing rollover of the vehicle as it negotiates right or left curves, yet without affecting the pressure in cells 45 and 47, should one or the other right or left wheels fall into a depression in the road or both wheels fall into a depression in the road, or one or the other right or left wheels strike a bump in the road or both wheels strike a bump in the road.

The construction of the valve is such and the lever arms for operating the same are such that it requires merely a slight movement clockwise or counterclockwise to effect the operation of the piston 55. Therefore practically as soon as centrifugal force is brought into action, the piston 55 is moved to increase or decrease the pressure in cell 45 and simultaneously decrease or increase the pressure in valve 47, to counteract the centrifugal force.

Referring now to the embodiment shown in FIGS. 5, 6, and 7, here the resilient means is in the form of two torsion bars, the left torsion bar 189 only being shown. It will be understood that the chassis shown in FIGS. 5, 6, and 7 is of the four wheel type, the left forward end only being shown. The left side frame is indicated at 191 having a forward extension 193 for carrying a bumper, and a front frame 195 suitably secured to the side frame 191. A cross frame 197 is also secured to the side frame 191. The front frame 195 includes an elongated bearing 199 disposed substantially longitudinally of the chassis, and the cross frame 197 carries a bracket 201 forming a bearing 203 which is longitudinally aligned with bearing 199. The torsion bar 189 is journaled in these bearings 199 and 203. It will be understood that like bearings 199 and 203 are also provided on the right side of the vehicle. The torsion bar 189 is provided with two splines 205 and 207 disposed forwardly and rearwardly of the bearing 199. Lever 209 having legs 211 and 213 are fastened by complementing splines to the splines 205 and 207, respectively, of the torsion bar 189. The outer end of the lever 209 forms a journal 215 for a pin 217. An axle supporting link 219 is journaled on the pin 217. The upper part of the frame 191 carries a bracket 221 forming a journal for a pin 223. One end of the lever 225 is journaled on the pin 223. The other end of the lever 225 is journaled on the axle supporting link 219 by a pin 227. Thus it will be seen that any twisting movement imparted to the torsion bar 189 will have a tendency to swing the axle supporting link 219 about the arm 209 and the lever 225 guides the link 219. The axle (of the axle supporting link 219) carries a front wheel 229.

The rear end of the torsion bar 189 is also supplied with a spline 231 having spline relationship with a lever or torsion bar loading arm 233. This arm is attached to a piston rod 235 connected to a piston 310 that is disposed within the cylinder 237 of a hydraulic motor 239. This hydraulic motor 239 is pivoted by a pin 241 on to the cross frame 197. From the foregoing it will be seen that the torsion bar 189 functions as a resilient means, interposed between the unsprung weight portion (including wheel and member 219) and the sprung weight portion, namely the frame and the elements carried by the frame. The torsion of the bar 189 can be varied by twisting the same through the torsion bar loading arm 233, and this is accomplished by the hydraulic motor 239. It is to be understood that a similar hydraulic motor and cooperating elements are also provided on the right side of the car for the torsion bar at that side.

Figure 18:
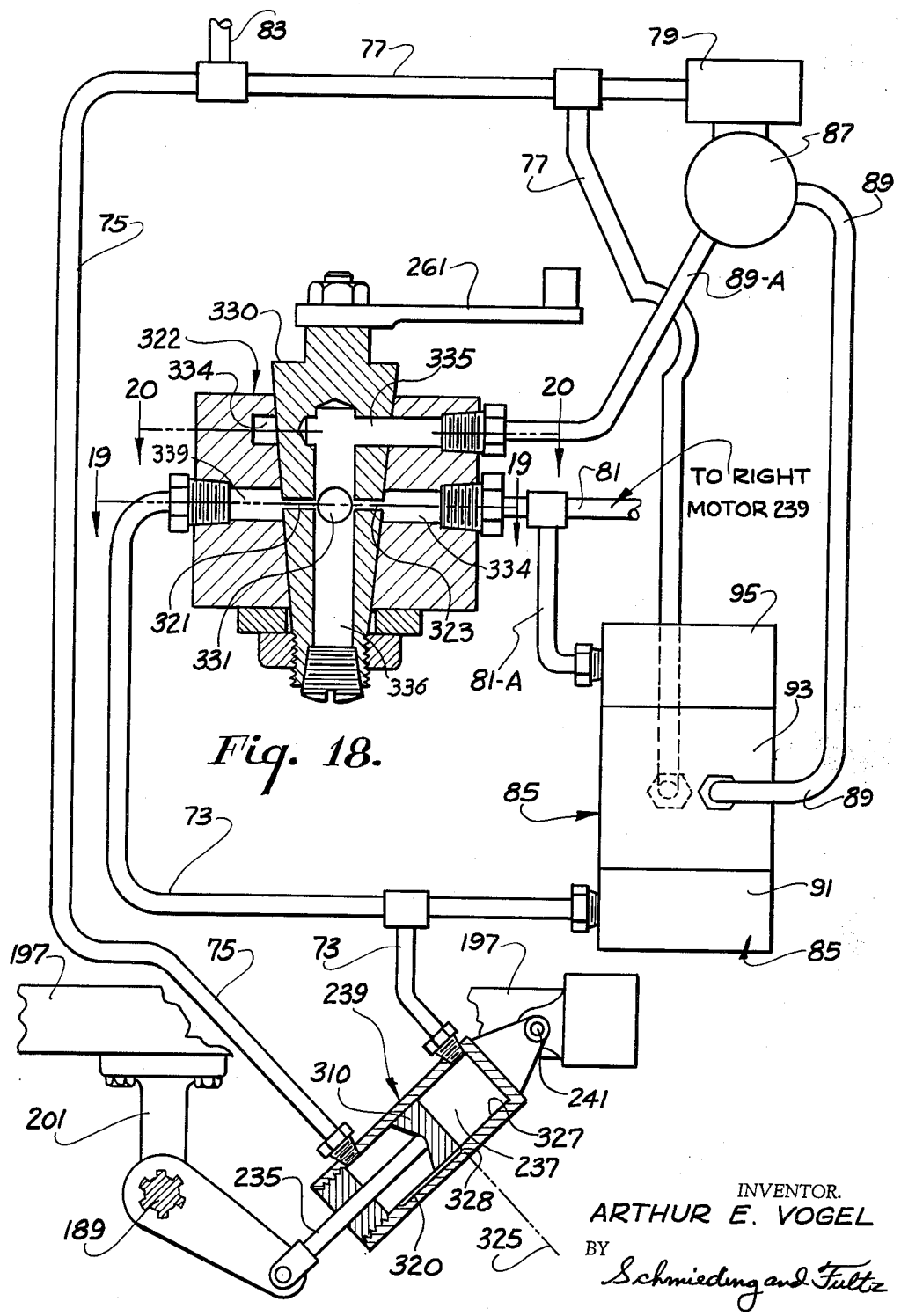
FIG. 18 is a diagrammatic view illustrating a levelizing control for a hydraulic torsion bar system constructed according to a second aspect of the present invention.
Figure 19:
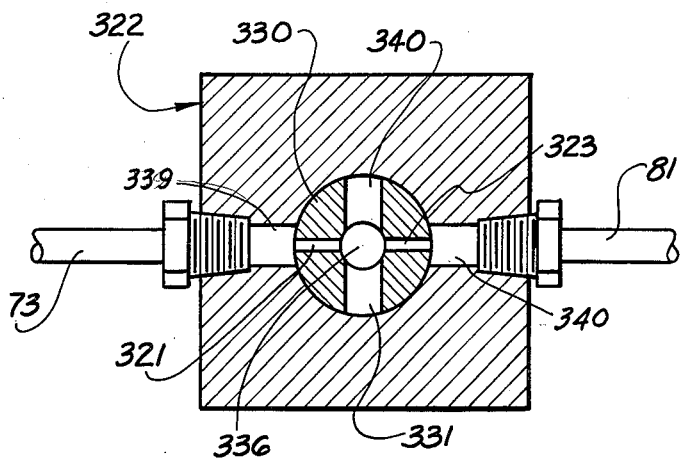
FIG. 19 is a sectional view of the lift valve of FIG. 18, the section being taken along a line 19—19 of FIG. 18.
Figure 20:
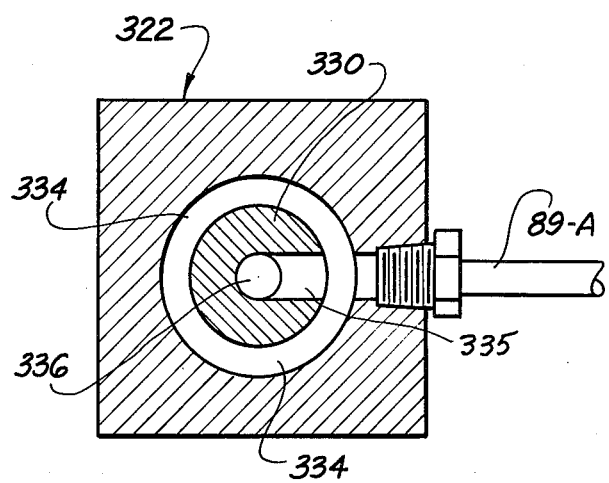
FIG. 20 is a second sectional view of the lift valve of FIG. 18, the section being taken along the line 20—20 of FIG. 18.

Reference is next made to FIG. 18 which diagrammatically illustrates a leveling apparatus for the torsion bar suspension system of FIGS. 5 through 7. The apparatus of FIG. 18 includes a position command orifice 320 of a type disclosed in detail in my co-pending applications Serial Nos. 519,078, now Patent No. 2,903,271, and 579,928, now Patent No. 2,992,836, filed June 30, 1955, and April 23, 1956, respectively.

In general, pressurized hydraulic fluid from pump 87 passes through a line 89–A and small orifice 321 of a lift valve indicated generally at 322 and thence through the line 73 to cylinder 237 of motor 239. At the same time fluid from pump 87 is released through a second small orifice 323 in lift valve 322 to the line 81 leading to a right fluid motor not illustrated. This occurs when lift lever 261 is in the normal restricted flow position illustrated in FIG. 18.

Pressurized fluid in cylinder 237 constantly urges piston 310 downwardly to a datum line 325 at which location a small flow of pressurized fluid continuously flows past piston 310 due to the presence of position command orifice 320 which is preferably in the form of a vertically extending slot formed into the inner surface 327 of cylinder 237. The upper termination 328 of slot or position command orifice 320 establishes the location of datum line 325 which represents the location of the piston, relative to the cylinder, when the suspension system is in a normal configuration. It will be understood that the pressure required to continuously maintain piston 310 at normal configuration datum line 325 serves to apply a predetermined torque to torsion bar 189.

Valve 85, previously described in detail herein, serves as a sensing unit to determine when fluid is required or should be released from the fluid motors 239.

When it is desired to wind left torsion bar 189, to increase the torsion applied thereto, pressurized fluid is rapidly admitted from side 91 of valve 85 through line 73 to cylinder 237. At the same time, fluid is released from a cylinder in right motor (not shown) to unwind the torsion bar on the opposite side of the vehicle. It should be pointed out that when roll control is required the flow from the left side 91 of the valve 85 is at a relatively high rate as compared to the minute rate of flow continuously passed through position command orifice 320. Hence piston 310 will be moved rapidly below datum when valve 85 senses a requirement for a roll control correction.

When it is desired to unwind left torsion bar 189, in a counterclockwise direction as viewed in FIGS. 6 and 18, the left side 91 of valve 85 serves to rapidly drain cylinder 237 via lines 73 and 77 to reservoir. At the same time fluid is released from the left motor 239 and the fluid motor on the right side of the vehicle is pressurized to wind its respective torsion bar and increase the torque applied thereto.

If it is desired to increase the ground clearance of the vehicle to negotiate rough terrain, this can be accomplished by actuating lever 261 of lift valve 322 to rotate a spool 330 whereby large passages 331 are caused to register with lines 73 and 81 leading to the cylinders 237 of both fluid motors one of which is shown at 239. When the valve is in the lift position, fluid passes from pump 87 via line 89–A, annular chamber 334, horizontal spool passage 335, vertical spool passage 336, large passages 331, 339 and 340, and lines 73 and 81 to said fluid motors 239. Since large passages 331, 339 and 340 connect line 89–A with lines 73 and 81, relatively high flow rates are delivered to chambers 237 of said fluid motors 239 which flow rates exceed the minute fluid release flow rates continuously passed through position command orifice 320 which drives piston 310 downwardly, below datum 325, and torsion bars 189 are wound to an increased torque configuration whereby desired ground clearance is achieved. It will be understood that the relatively small flow release capacity of position command orifice 320 is insufficient to carry back to reservoir 79 the relatively high flow rate passed through large passages 331 and 340 in lift valve 322.

The twists of the torsion bars, through the motors 239, are controlled by the valve 85. The fluid paths through the valve 85 are as was previously explained hereinbefore.

In this embodiment the lever arm 163 only is shown, and it will be understood that the lever 157 is disposed at the opposite side of the vehicle. Here the shaft 119 for the valve 149 is journaled on a bracket 243 carried by the frame 191. As seen from FIG. 7, arm 163 is connected with the lever 209 by an adjustable link 245.

In this embodiment, should the sprung weight move clockwise, as viewed in FIG. 7, the lever 163 will be pulled downwardly and the complementing lever 157, on the right side of the vehicle, will be forced upwardly. The valve ports will be so aligned then that the torsion of the left torsion bar 89 will be increased and the torsion of the complementing bar on the right side of the vehicle will be decreased. The reverse, of course, will occur when the sprung weight moves in a counterclockwise direction, namely the valve actuating arm 163 will be raised and the valve arm 157 will be lowered, to effect an increase in the torsion of the right torsion bar and decrease the torsion on the left torsion bar through the motor 239.

As viewed in FIG. 7, due to the weight of this sprung mass, the movement of tension or torque, exerted by the bar 189 is in a clockwise direction, tending to lift the sprung mass or sprung weight portion. An additive force should be applied should the sprung mass be moved by centrifugal force counterclockwise, i.e., FIG. 7, the torque value should be increased so as to counteract the downward movement of the sprung mass. This is accomplished by twisting the opposite end of the bar 189 clockwise, but as viewed in FIG. 6, in a counterclockwise direction. As viewed in FIG. 6, this is accomplished by twisting clockwise by the hydraulic motor 239-A. This requires the extension of the piston rod 235, and this is accomplished by applying pressure through the conduit 73.

The steering box is indicated at 247, and a steering link is suitably connected to the mechanism in the steering box and is shown at 249, which in turn is connected with the steering arm 251 suitably connected with the steering link 219. The steering tie rod is indicated at 253.

While the control mechanism in FIG. 1 is shown merely as applied to the rear of the vehicle and the control mechanism is applied only to the front of the vehicle in FIGS. 5, 6, and 7, it is to be understood that, if desirable, a similar control could be applied to the front of the vehicle shown in FIG. 1 or to the rear of the vehicle shown in FIG. 5.

While the forms of embodiments herein shown and described constitute preferred forms, it is to be understood that other forms may be adopted falling within the scope of the claims that follow.

I claim:

1. Apparatus for controlling the supporting system of a vehicle having sprung and unsprung weight portions connected by resilient means, under pressure, on the right and left sides of the vehicle, which apparatus comprises: means forming a constant source of fluid under pressure; mechanism including valve means for controlling the flow of fluid of said source for effecting increase in the resistance to deflection of the resilient means on the right side of the vehicle under a certain condition, and for controlling the flow of fluid of said source for effecting increase in the resistance to deflection of the resilient means on the left side of the vehicle under a certain other condition, said valve means including a body portion, a right movable flow control element operatively associated with the right side of said unsprung weight, and a left movable flow control element operatively associated with the left side of said unsprung weight, each of said flow control elements including a centered position, an up position, and a down position, said body portion and flow control elements including a plurality of ports for delivering pressurized fluid through said valve means to one of said resilient means when one of said elements is in its up position and the other of said elements is in its down position, and for delivering pressurized fluid through said valve means to the other of said resilient means when said other of said elements is in its up position and said one element is in its down position.

2. Apparatus as defined in claim 1, characterized for controlling a system in which the resilient means comprises two torsion bars, one bar being disposed on the right side of the vehicle and having its opposite ends connected with the sprung and unsprung weight portions and the other bar being disposed on the right side of the vehicle and having its opposite ends connected with the sprung and unsprung weight portions of the vehicle, and further characterized in that torsion of the right bar is increased under the first mentioned condition and the torsion of the left bar is increased under the second mentioned condition.

3. Apparatus for controlling the supporting system of a vehicle having sprung and unsprung weight portions connected by resilient means, under pressure, on the right and left side of the vehicle, which apparatus comprises: means forming a constant source of fluid under pressure; mechanism including valve means adapted for controlling the flow of fluid of said source for simultaneously effecting increase in the resistance to deflection of the resilient means on the right side of the vehicle and decrease in the resistance to deflection of the resilient means on the left side of the vehicle under a certain condition, and for controlling the flow of fluid of said source for simultaneously effecting increase in the resistance to deflection of the resilient means on the left side of the vehicle and decrease in the resistance to deflection of the resilient means on the right side of the vehicle under a certain other condition, said valve means including a body portion, a right movable flow control element operatively associated with the right side of said unsprung weight, and a left movable flow control element operatively associated with the left side of said unsprung weight, each of said flow control elements including a centered position, an up position, and a down position, said body portion and flow control elements including a plurality of ports for delivering pressurized fluid through said valve means to one of said resilient means when one of said elements is in its up position and the other of said elements is in its down position, and for delivering pressurized fluid through said valve means to the other of said resilient means when said other of said elements is in its up position and said one element is in its down position.

4. Apparatus as defined in claim 3, characterized for controlling a system in which the resilient means comprises two torsion bars, one bar being disposed on the right side of the vehicle and having its opposite ends connected with the sprung and unsprung weight portions and the other bar being disposed on the right side of the vehicle and having its opposite ends connected with the sprung and unsprung weight portions of the vehicle, and further characterized in that torsion of the right bar is increased and the torsion of the left bar is decreased, under the first mentioned condition, and, the torsion of the left bar is increased and the torsion of the right bar is decreased, under the second mentioned condition.

5. Apparatus for controlling the supporting system of a vehicle having sprung and unsprung weight portions connected by resilient means, under pressure, on the right and left sides of the vehicle, which apparatus comprises: a first fluid motor adapted to be associated with the resilient means for increasing and decreasing the resistance to deflection of the resilient means between the unsprung weight portion and the right side of the sprung weight portion; a second fluid motor adapted to be associated with the resilient means for increasing and decreasing the resistance to deflection of the resilient means between the unsprung weight portion and the left side of the sprung weight; a constantly operated fluid pump connectible with both of said motors; control means for the motors including valve means between the pump and motors, said valve means including a body portion, a right movable flow control element operatively associated with the right side of said unsprung weight, and a left movable flow control element operatively associated with the left side of said unsprung weight, each of said flow control elements including a centered position, an up position, and a down position, said body portion and flow control elements including a plurality of ports for delivering pressurized fluid through said valve means to one of said fluid motors when one of said elements is in its up position and the other of said elements is in its down position, and for delivering pressurized fluid through said valve means to the other of said fluid motors when said other of said elements is in its up position and said one element is in its down position.

6. Control apparatus as defined in claim 5, for supporting system of a vehicle in which the resilient means comprises two torsion bars, one bar having one end connected with the sprung weight on the right side of the vehicle and the other end thereof connected with the unsprung weight on the right side of the vehicle, the other of said torsion bars having its ends connected with the sprung and unsprung weights on the left side of the vehicle, characterized in that the second motor is adapted to increase the torsion of the left bar only upon force tending to rotate the sprung weight in a clockwise direction, and characterized in that the first motor is adapted to increase the torsion of the right bar only upon force tending to rotate the sprung weight in a counterclockwise direction.

7. Apparatus for controlling the supporting system of a vehicle having sprung and unsprung weight portions connected by resilient means, under pressure, on the right and left sides of the vehicle, which apparatus comprises: a first fluid motor adapted to be associated with the resilient means for increasing and decreasing the resistance to deflection of the resilient means between the unsprung weight portion and the right side of the sprung weight portion; a second fluid motor adapted to be associated with the resilient means for increasing and decreasing the resistance to deflection of the resilient means between the unsprung weight portion and the left side of the sprung weight; a constantly operated fluid pump connectible with both of said motors; control means for the motors including valve means between the pump and motors, said valve means including a body portion, a right movable flow control element operatively associated with the right side of said unsprung weight, and a left movable flow control element operatively associated with the left side of said unsprung weight each of said flow control elements including a centered position, an up position, said body portion and flow control elements including a plurality of ports for delivering pressurized fluid through said valve means to one of said fluid motors and from the other of said fluid motors when one of said elements is in its up position and the other of said elements is in its down position, and for delivering pressurized fluid through said valve means to the other of said fluid motors and from said one of said fluid motors when said other of said elements is in its up position and said one element is in its down position.

8. Control apparatus as defined in claim 7 for a supporting system of a vehicle in which the resilient means comprises two torsion bars, one bar having one end connected with the sprung weight on the right side of the vehicle and the other end thereof connected with the unsprung weight on the right side of the vehicle, the other of said torsion bars having its ends connected with the sprung and unsprung weights on the left side of the vehicle, characterized in that the second motor is adapted to increase the torsion of the left bar and the first motor is simultaneously adapted to decrease the torsion of the right bar only upon force tending to rotate the sprung weight in a clockwise direction, and characterized in that the first motor is adapted to increase the torsion of the right bar and the first motor is simultaneously adapted to decrease the torsion of the left bar only upon force tending to rotate the sprung weight in a counterclockwise direction.

9. Apparatus for controlling the supporting system of a vehicle having sprung and unsprung weight portions connected by resilient means, under pressure, on the right and left sides of the vehicle, which apparatus comprises: a first fluid motor adapted to be associated with the resilient means for increasing and decreasing the resistance to deflection of the resilient means between the unsprung weight portion and the right side of the sprung weight portion; a second fluid motor adapted to be associated with the resilient means for increasing and decreasing the resistance to deflection of the resilient means between the unsprung weight portion and the left side of the sprung weight; a constantly operated fluid pump connectible with both of said motors; control means for the motors including valve means between the pump and motors, said valve means including a body portion, a right movable flow control element operatively associated with the right side of said unsprung weight, and a left movable flow control element operatively associated with the left side of said unsprung weight, each of said flow control elements including a centered position, an up position, and a down position, said body portion and flow control elements including a plurality of ports for delivering pressurized fluid through said valve means to one of said fluid motors when one of said elements is in its up position and the other of said elements is in its down position, and for delivering pressurized fluid through said valve means to the other of said fluid motors when said other of said elements is in its up position and said one element is in its down position and manually actuated means for controlling the flow of fluid to one of said motors.

10. A valve means for sensing and correcting roll conditions encountered by a vehicle having sprung and unsprung weights connected by right and left resilient means, said valve means comprising, in combination, a body portion for disposition on the sprung weight of said vehicle and including a first port for receiving pressurized fluid from a source; a second port for releasing pressurized fluid to a reservoir; a third port for the flow of fluid to and from said right resilient means; and a fourth port for the flow of fluid to and from said left resilient means; a right movable flow control element within said body portion; a left movable flow control element within said body portion; a right operative connector between said right movable control elements and the right side of said unsprung weight; a left operative connector between said left movable flow control element and the left side of said unsprung weight; each of said operative connectors including a centered position, an up position, and a down position, said body portion and movable flow control elements including a plurality of ports so arranged to admit and release fluid to and from said resilient means only when one of said operative connectors is in its up position and the other of said operative connectors is in its down position and only when said other of said operative connectors is in its up position and said one operative connector is in its down position.

11. An apparatus for controlling the suspension system of a vehicle of the type having sprung and unsprung weights connected by right and left resilient means, said apparatus comprising, in combination, right and left fluid motors for increasing and decreasing the forces exerted by said right and left resilient means, each of said fluid motors including: a cylinder connected to one of said weights, a piston connected to the other of said weights, and a position command orifice for releasing fluid past said piston at a predetermined datum location of said piston in said cylinder; pump means for delivering pressurized fluid to said cylinders on one side of each of said pistons; reservoir means for receiving fluid from said cylinders on the other sides of said pistons; and valve means for the flow of fluid between said pump means and said cylinders, said height control valve means including a low flow position wherein the volumetric flow through said height control valve means is less than the volumetric flow capacity through said position command orifices, and a high flow position wherein the volumetric flow through said height control valve means is greater than the volumetric flow capacity through said position command orifices.

12. An apparatus for controlling the suspension system of a vehicle of the type having sprung and unsprung weights connected by right and left resilient means, said apparatus comprising, in combination, right and left fluid motors for increasing and decreasing the forces exerted by said right and left resilient means, each of said fluid motors including: a cylinder connected to one of said weights, a piston connected to the other of said weights, and a position command orifice for releasing fluid past said piston at a predetermined datum location of said piston in said cylinder; pump means for delivering pressurized fluid to said cylinders on one side of each of said pistons; reservoir means for receiving fluid from said cylinders on the other sides of said pistons; height control valve means for the flow of fluid between said pump means and said cylinders, said height control valve means including a low flow position wherein the volumetric flow through said height control valve means is less than the volumetric flow capacity through said position command orifices, and a high flow position wherein the volumetric flow through said height control valve means is greater than the volumetric flow capacity through said position command orifices; and a roll control valve means including a first port for receiving pressurized fluid, a second port for draining fluid, a right port communicating with said right fluid motor on said one side of said piston and a left port communicating with said left fluid motor on said one side of said piston, the volumetric flow capacities of said right and left ports of said roll control valve means being greater than the volumetric flow capacities of said position command orifices in said fluid motors.

13. An apparatus for controlling the suspension system of a vehicle of the type having sprung and unsprung weights connected by right and left resilient means, said apparatus comprising, in combination, right and left fluid motors for increasing and decreasing the forces exerted by said right and left resilient means, each of said fluid motors including: a cylinder connected to one of said weights, a piston connected to the other of said weights, and a position command orifice for releasing fluid past said piston at a predetermined datum location of said piston in said cylinder; means for delivering pressurized fluid to said cylinders at volumetric flow rates less than the volumetric flow capacities of said position command orifices; and a roll control valve means including a first port for receiving pressurized fluid, a second port for draining fluid, a right port communicating with said right fluid motor on said one side of said piston and a left port communicating with said left fluid motor on said one side of said piston, the volumetric flow capacities of said right and left ports of said roll control valve means being greater than the volumetric flow capacities of said position command orifices in said fluid motors.

References Cited in the file of this patent

UNITED STATES PATENTS

| | | |
|---|---|---|
| 2,165,617 | Paes | July 11, 1939 |
| 2,650,107 | Monnig | Aug. 25, 1953 |
| 2,787,474 | Brueder | Apr. 2, 1957 |

FOREIGN PATENTS

| | | |
|---|---|---|
| 912,900 | Germany | June 3, 1954 |